Dec. 25, 1923.  1,478,642
N. E. DUFTY
SHOCK ABSORBING DEVICE FOR SPRING SUPPORTED VEHICLES
Filed July 5, 1921
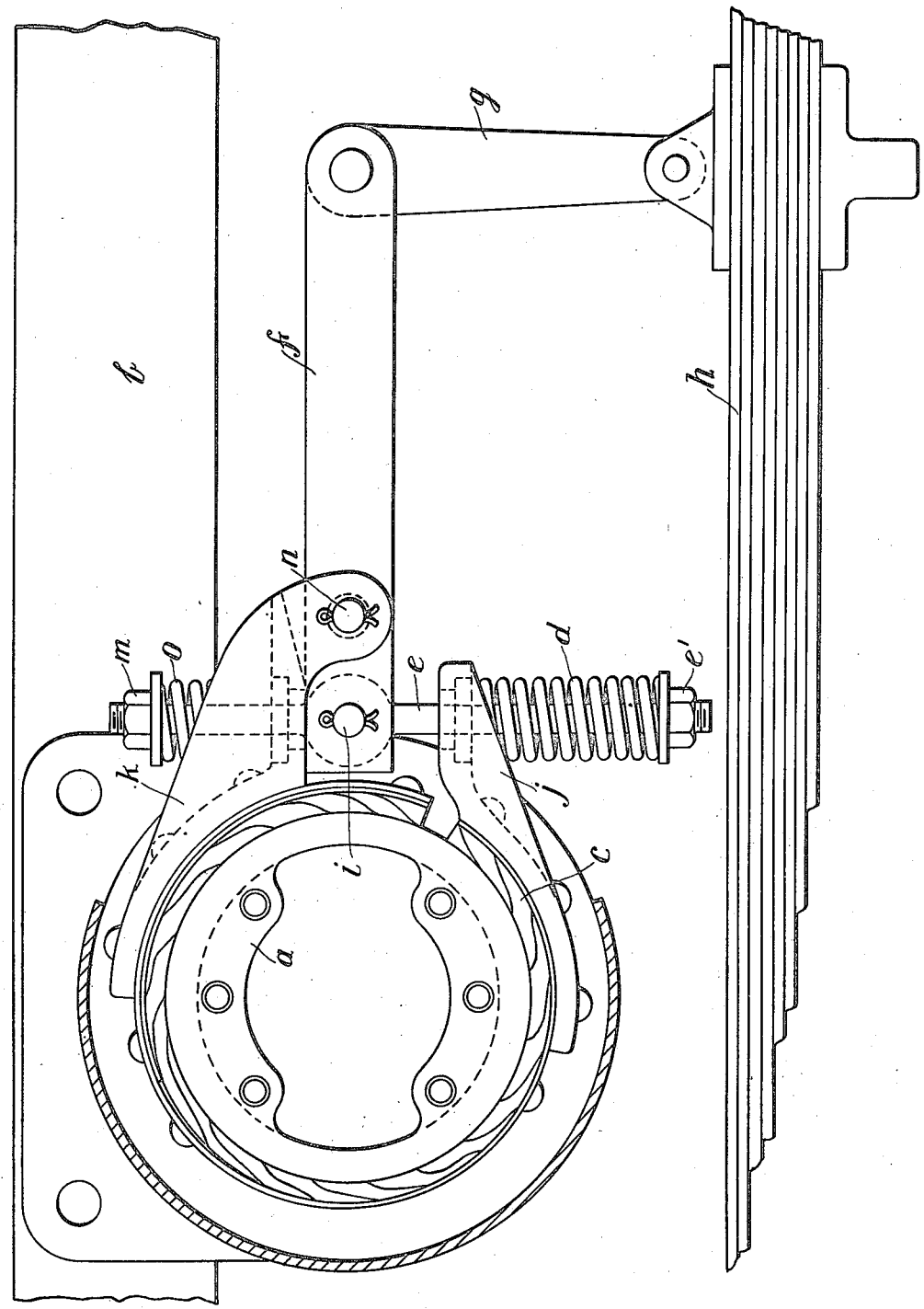

Patented Dec. 25, 1923.

1,478,642

UNITED STATES PATENT OFFICE.

NOËL EVELYN DUFTY, OF LONDON, ENGLAND.

SHOCK-ABSORBING DEVICE FOR SPRING-SUPPORTED VEHICLES.

Application filed July 5, 1921. Serial No. 482,549.

*To all whom it may concern:*

Be it known that I, NOËL EVELYN DUFTY, a subject of the King of Great Britain, residing at 57 Tulse Hill, London, S. W. 2, England, have invented new and useful Improvements in Shock-Absorbing Devices for Spring-Supported Vehicles, of which the following is a specification.

This invention relates to shock absorbing devices for spring supported vehicles and has for its object to improve upon that kind of device in which each vehicle spring is connected with a brake band and drum in such a manner that rebound of the axle and spring after compression of the latter is opposed by engagement of the band and drum.

The improvement according to the present invention consists in the provision of a lever pivotally connected to an axle tree and to one end of a brake band in such a manner that compression of a vehicle spring causes said lever to force the ends of said brake band apart by acting against a member carried by the opposite end of the brake band.

The accompanying drawing is an elevation of a shock absorbing device constructed in accordance with this invention.

Referring to the drawing $a$ is a brake drum rigidly fixed to the body or chassis $b$ of a vehicle. A brake band $c$ is mounted round this brake drum in the usual manner, the friction between the drum and the brake band being maintained by a spring $d$ the pressure of which is adjustable by means of a bolt $e$ and nut $e'$. A lever $f$ is pivoted at $n$ to an extension of an upper jaw $k'$ and is connected at one end by a link $g$ with a vehicle spring $h$ and is pivoted at the opposite end $i$ to the central portion of the bolt $e$ which is provided with an additional spring $o$ disposed between the jaw $k$ and nut $m$.

The operation of the invention is as follows:—

When the vehicle spring $h$ is compressed beyond a pre-determined limit the right-hand end of lever $f$ is raised the lever moving in a rotary direction around its pivot in the jaw $k$. The left-hand end of the lever is thus lowered relieving the pressure of spring $d$ which normally causes the brake band $c$ to grip the drum $a$. When the pressure of the spring is relieved the brake band also relaxes its grip on the drum. Owing to the connection of the springs $d$ and $o$ by the bolt $e$ the expansion of the former is limited by the corresponding compression which is applied simultaneously to the spring $o$, this limitation being adjustable by means of the nuts $e'$ and $m$.

As soon as the vehicle spring $h$ begins its rebound movement to normal position the lever $f$ moves in a direction opposite to that above described, causing the spring $d$ again to be compressed and the brake band $c$ to grip the drum and the full braking effort to be opposed to the rebound of the spring $h$.

I claim:—

A shock absorber comprising a fixed drum, a brake band thereon and open at one side, jaws attached to the ends of the band, a lever fulcrumed to one of the jaws and arranged to bear with its shorter arm thereunder and between the jaws, a link to connect the longer arm of the lever to an axle, a bolt pivotally connected to the shorter arm of the lever and extending in opposite directions loosely through said jaws and springs carried by said bolt and bearing against said jaws and active to normally force the jaws toward each other and thereby frictionally grip the brake band on the drum.

In witness whereof I affix my signature.

NOËL EVELYN DUFTY.